UNITED STATES PATENT OFFICE.

ALBERT HERRMANN, OF HÖCHST-ON-THE-MAIN, GERMANY, ASSIGNOR TO THE FARBWERKE, VORMALS MEISTER, LUCIUS & BRÜNING, OF SAME PLACE.

COLORING-MATTER.

SPECIFICATION forming part of Reissued Letters Patent No. 11,078, dated May 20, 1890.

Original No. 412,614, dated October 8, 1889. Aplication for reissue filed February 6, 1890. Serial No. 339,496. Patented in Belgium September 3, 1888, No. 83,650; in France September 5, 1888, No. 192,807; in Italy September 30, 1888, XLVII, 463; in Germany October 13, 1888, No. 48,523; in England October 15, 1888, No. 14,822; in Spain December 7, 1888, No. 8,810, and in Austria-Hungary May 4, 1889, No. 42,683 and No. 65,518.

*To all whom it may concern:*

Be it known that I, ALBERT HERRMANN, a citizen of the Empire of Germany, residing at Höchst-on-the-Main, in the Empire of Germany, have invented certain new and useful Improvements in Coloring-Matter, (the same having been patented in France, September 5, 1888, No. 192,807; in Belgium September 3, 1888, No. 83,650, and in Italy September 30, 1888, No. 463, Vol. 47; in Germany October 13, 1888, No. 48,523; in England October 15, 1888, No. 14,822; in Spain December 7, 1888, No. 8,810, and in Austria-Hungary May 4, 1889, No. 42,683 and No. 65,518;) and I do hereby declare the following to be a full, clear, and exact description of the invention, such as will enable others skilled in the art to which it appertains to make and use the same.

In two other applications (Serial Nos. 296,389 and 296,391) for Letters Patent I have described coloring-matters which are to be considered as derivatives of the metaoxydiamidotriphenyl methane $$CH\begin{cases} C_6H_4OH_{(m)} \\ C_6H_4NH_{2(p)}, \\ C_6H_4NH_{2(p)} \end{cases}$$

and have put prominently forward that the sulphonic acids of the metaoxytetralkyldiamidotriphenyl carbinols $$C(OH)\begin{cases} C_6H_4OH \\ C_6H_4N(Alk)_2 \\ C_6H_4N(Alk)_2 \end{cases}$$

have valuable qualities. Such sulphonic acids I have obtained by carrying out the following operations: First condensing metanitrobenzaldehyde with two molecules of a tertiary aromatic amine, (*Berichte der deutschen chemischen Gesellschaft*, 12, 802;) second, reducing the meta-nitro leuco base to the meta-amido leuco base; third, treatment of the meta-amido leuco base with nitrous acid; fourth, sulphonating the metaoxy leuco base thus formed and oxidizing the leuco sulphonic acid. Since I have discovered that also very fast coloring-matter may be obtained by direct sulphonation of the meta-amido leuco bases prepared by the second operation and subsequent oxidation of the leuco sulphonic acids. The identical acid coloring-matter may be obtained by oxidation of the meta-amido leuco bases and subsequent sulphonation of the formed basic coloring-matter.

I. PREPARATION OF SULPHONIC ACID OF METAAMIDOTETRALKYLDIAMIDOTRIPHENYL METHANE.

The sulphonic acids of the meta-amido leuco bases of the generic formula $$CH\begin{matrix} C_6H_4NH_{2(3)} \\ [C_6H_4N(Alk)_2]_2 \end{matrix}$$

are obtained by heating the bases with sulphuric acid, or, more advantageously, with fuming sulphuric acid. I proceed as follows:

*Example No.* 1.—Thirty parts, by weight, of meta-amidotetraethyldiamidotriphenyl methane are dissolved in one hundred and fifty parts, by weight, of fuming sulphuric acid of twenty per cent. $SO_3$. When the solution is slightly heated or left standing for a considerable time, there is first formed a sulphonic acid the ammoniacal salt of which is with difficulty soluble, and therefore gives a clear solution with hot diluted ammonia only. It is therefore more advantageous, principally in view of the qualities of the coloring-matter resulting, to make use of a sulphonic acid the ammoniacal salt of which is easily soluble. To this effect the liquid of the sulphonation is heated to 90° to 100° centigrade until a sample gives a clear solution with cold ammonia of three per cent. The mass of the reaction is converted then into the calcium or sodium salt in a manner well known. The calcium salt is a powder easily soluble in water and in alcohol. In the same manner I proceed for the preparation of the sulphonic acids, respectively, of the calcium salts of the same prepared from meta-amidotetramethyldiamidotriphenyl methane, meta-amidodimethyldiethyldiamidotriphenyl methhane symmetric, $$CH\begin{matrix}C_6H_4NH_2\\[C_6H_4NCH_3\\C_2H_5]_2,\end{matrix}$$

meta-amidodimethyldiethyldiamidotriphenyl methane unsymmetric, $$CH\begin{cases}C_6H_4NH_2\\C_6H_4N(CH_3)_2,\\C_6H_4N(C_2H_5)_2\end{cases}$$

meta-amidotetramethyldiamidodiorthotolylphenyl methane, and meta-amidotetraethyldiamidodiorthotolylphenyl methane.

*Example No.* 2.—Somewhat different is the manner of preparing the sulphonic acids of those leuco bases that are still aromatic in the amido group, and are therefore apt to be sulphonated, such as benzyl or phenyl. The compounds appertaining to this class are the following, viz: meta-amidodibenzyldimethyl diamidotriphenyl methane, $$CH\begin{cases}C_6H_4NH_2\\C_6H_4N(CH_3)(C_7H_7),\\C_6H_4N(CH_3)(C_7H_7)\end{cases}$$

meta-amidodibenzyldiethyldiamidotriphenyl methane, meta-amidodiphenyldimethyldiamidotriphenyl methane, and meta-amidodiphenyldiethyldiamidotriphenyl methane. The manner in which the sulphonation of these leuco bases is carried out I explain by the following example: Thirty parts, by weight, of meta-amidodiethyldibenzyldiamidotriphenyl methane are dissolved in one hundred and fifty parts, by weight, of fuming sulphuric acid of twenty per cent. $SO_3$. At ordinary temperature a sulphonic acid soluble in water with difficulty is formed. Afterward the solution is heated for several hours to 60° centigrade, until a sample dissolves easily in water, and also gives with diluted ammonia a clear solution of violet tint. Now the mass of the reaction is poured into water and converted into the calcium or sodium salt in manner well known.

II. OXIDATION OF THE LEUCO SULPHONIC ACID.

From the calcium salts of the leuco sulphonic acids mentioned hereinbefore is prepared the corresponding coloring-matter by oxidation with peroxides—such as mangan peroxide, lead peroxide, or barium peroxide—in the presence of the calculated quantity of a mineral acid. The oxidation is carried out in the manner described in the following example: Ten parts, by weight, of the calcium salt of the sulphonic acid prepared from meta-amidotetraethyldiamidotriphenyl methane are dissolved in about three hundred parts, by weight, of water. Then there are added the calculated quantities of diluted sulphuric acid and superoxide of lead filtered off from the precipitated sulphate of lead, and the blue solution of coloring-matter is evaporated to dryness.

The new coloring-matter is in the form of a copper-red powder of metallic luster, dissolving quite easily in water with blue tint. The aqueous solution comports against mineral acids and against alkalies in quite the same manner as the acid coloring-matter deriving from metaoxytetralkyldiamidotriphenyl methane. By the addition of an of mineral acids the solution is colored green. The blue coloring does not disappear on the addition of cold soda-lye, neither on being boiled with diluted ammonia or soda solution. The blue solution turns violet only when boiled with soda-lye. The new coloring-matter dyes wool and silk in acid bath a level green-blue shade, and the shades excel by great fastness.

III. CONVERSION OF META-AMIDOTETRALKYLDIAMIDOTRIPHENYL CARBINOL INTO ACID COLORING-MATTER.

The meta-amidotetralkyldiamidotriphenyl carbinols are green coloring-matters which, according to E. & O. Fischer, (*Berichte der deutschen chemischen Gesellschaft*, 12,803,) are obtained by oxidation of the corresponding meta-amidotetralkyldiamidotriphenyl methanes. These coloring-matters—viz., the sulphates or chlorhydrates of meta-amidotetramethyldiamidotriphenyl carbinol, meta-amidotetraethyldiamidotriphenyl carbinol, meta-amidodimethyldiethyldiamidotriphenyl carbinol symmetric, $$COH\begin{matrix}C_6H_4NH_2\\[C_6H_4NCH_3C_2H_5]_2,\end{matrix}$$

meta-amidodimethyldiethyldiamidotriphenyl carbinol unsymmetric, $$COH\begin{cases}C_6H_4NH_2\\C_6H_4N(CH_3)_2\\C_6H_4N(CH_5)_2,\end{cases}$$

meta-amidotetramethyldiamidodiortho-tolylphenyl carbinol, meta-amidotetraethyl-diamidodiorthotolylphenyl carbinol, meta-amidodimethyldibenzyldiamidotriphenyl carbinol, meta-amidodiethyldibenzyldiamidotriphenyl carbinol, meta-amidodimethyldiphenyldiamidotriphenyl carbinol, and meta-amidodiethyldibenzyldiamidotriphenyl carbinol—may be converted into acid coloring-matter identical to the coloring-matter described in sub. II by treatment with sulphuric acid. I proceed, for example, as follows: Twenty parts, by weight, of meta-amidotetraethyldiamidotriphenyl carbinol are dissolved in one hundred parts, by weight, of monohydrate and this solution heated to 70° or 80° centigrade, until a sample gives with diluted ammonia a clear solution of pure blue coloring. The mass of the reaction is then converted into the calcium or sodium salt in manner well known.

What I claim as new, and wish to secure by Letters Patent, is—

1. As a new article, blue-green coloring-matter, the sulphonic acid of meta-amidotetralkyldiamidotriphenyl carbinol, a copper-red powder with metallic luster, dissolving in water with blue color, dyeing wool and silk blue-green tints, and prepared according to the process herein described, or by any other process giving similar results.

2. The process of making fast blue-green color by dissolving meta-amidotetralkyldiamidotriphenyl methane in fuming sulphuric acid, heating the solution until a sample gives a clear solution with cold ammonia, converting the product of the reaction into the calcium or sodium salt, oxidizing the leuco sulphonic compound thus obtained with peroxide of lead or manganese and dilute sulphuric acid, and filtering and evaporating to dryness the color solution, as set forth.

In testimony whereof I affix my signature in presence of two witnesses.

ALBERT HERRMANN.

Witnesses:
JOSEF REVERDY,
HEINRICH HAHN.